US005659377A

United States Patent [19]
Dabbagh et al.

[11] Patent Number: 5,659,377
[45] Date of Patent: Aug. 19, 1997

[54] APPARATUS AND METHOD FOR FILLING LIQUID CRYSTAL DISPLAY CELLS

[75] Inventors: Gary Dabbagh, East Windsor; Cheng-Yih Lin, Parsippany, both of N.J.

[73] Assignee: Lucent Technologies Inc., Murray Hill, N.J.

[21] Appl. No.: 564,858

[22] Filed: Nov. 30, 1995

[51] Int. Cl.⁶ ............... G02F 1/1333; B65B 31/00; B67C 3/00
[52] U.S. Cl. ............... 349/84; 141/7; 141/51
[58] Field of Search ............... 359/62; 349/84; 141/7, 4, 31, 39, 51

[56] References Cited

U.S. PATENT DOCUMENTS

| | | | |
|---|---|---|---|
| 5,359,442 | 10/1994 | Tanaka et al. | 359/62 |
| 5,399,114 | 3/1995 | Park | 141/7 |
| 5,430,564 | 7/1995 | Harada et al. | 359/62 |
| 5,477,349 | 12/1995 | Fujiwara | 349/84 |
| 5,511,591 | 4/1996 | Abe | 141/7 |
| 5,546,998 | 8/1996 | Shimamune | 141/31 |
| 5,548,428 | 8/1996 | Masaki et al. | 359/62 |
| 5,564,479 | 10/1996 | Yoshihara | 141/7 |

FOREIGN PATENT DOCUMENTS

| | | | |
|---|---|---|---|
| 52-7015 | 1/1977 | Japan | 141/7 |
| 63-261224 | 10/1988 | Japan | 359/62 |
| 1-91112 | 4/1989 | Japan | 359/62 |
| 1-152421 | 6/1989 | Japan | 359/62 |
| 2-239225 | 9/1990 | Japan | 359/62 |
| 4-151123 | 5/1992 | Japan | 359/62 |

*Primary Examiner*—William L. Sikes
*Assistant Examiner*—Tiep H. Nguyen

[57] ABSTRACT

In accordance with the invention, an apparatus for filling an LCD cell comprises a capillary wick coupled to reservoir of liquid crystal material by capillary action. The cell is filled by disposing the plates containing an unsealed region in contact with the wick, minimizing contact between the cell and the material in the reservoir.

6 Claims, 1 Drawing Sheet

APPARATUS AND METHOD FOR FILLING LIQUID CRYSTAL DISPLAY CELLS

FIELD OF THE INVENTION

This invention relates to the manufacture of liquid crystal display devices and, in particular, to an apparatus and method for filling liquid crystal display cells with liquid crystal material.

BACKGROUND OF THE INVENTION

An important step in the fabrication of a liquid crystal display device is filling the display cell with liquid crystal material. Typically, the display cell is in the form of two closely spaced parallel plates sealed around a substantial portion of their periphery. The cell is typically filled with liquid crystal material by dipping an edge of the plates containing an unsealed region into a trough of liquid crystal material (see FIG. 1). The liquid crystal material is drawn through the unsealed region by capillary force.

The disadvantages of this conventional process arise because liquid crystal material is expensive and easily contaminated. Since a substantial length of the LCD cell is immersed in the liquid crystal material, there is substantial opportunity for contamination of the liquid crystal material and, indeed, it is common practice to discard the remaining material in the trough after filling. The amount of liquid crystal material lost in this process typically exceeds the mount that is actually used in the cell. This loss of expensive material is wasteful and adds significantly to the cost of making an LCD display. Accordingly, there is a need for an improved apparatus and method for filling LCD cells.

SUMMARY OF THE INVENTION

In accordance with the invention, an apparatus for filling an LCD cell comprises a capillary wick coupled to a reservoir of liquid crystal material by capillary action. The cell is filled by disposing the plates containing an unsealed region in contact with the wick, minimizing contact between the cell and the material in the reservoir.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
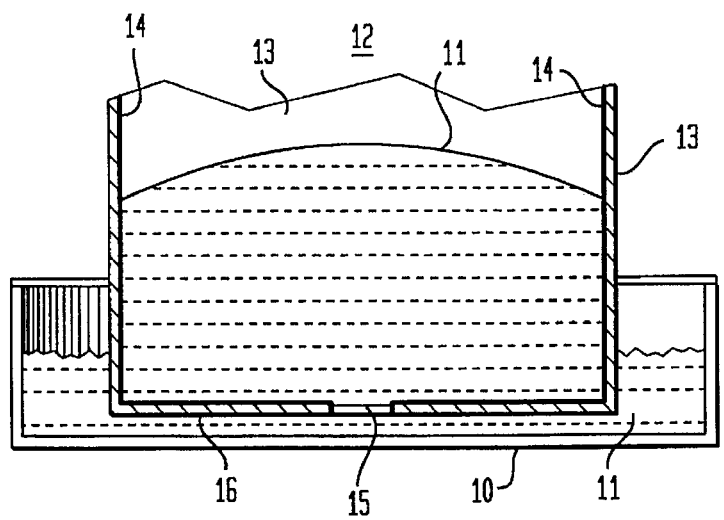
FIG. 1 is a schematic cross section of apparatus conventionally used to fill an LCD display cell.

Referring to the drawings, FIG. 1 schematically illustrates conventional cell-filling apparatus comprising a trough 10 of liquid crystal material 11. A typical LCD cell 12 comprises a pair of rectangular plates 13 (only one of which is visible) disposed in side-by-side congruent, closely-spaced relationship and sealed together by an edge sealant 14 around a substantial portion of the periphery. Here only a short filling aperture 15 remains unsealed on one cell edge 16. As shown, the conventional approach is to dip edge 16 into trough 10 and material 11 is drawn through aperture 15 by suction and capillary action.

Figure 2:
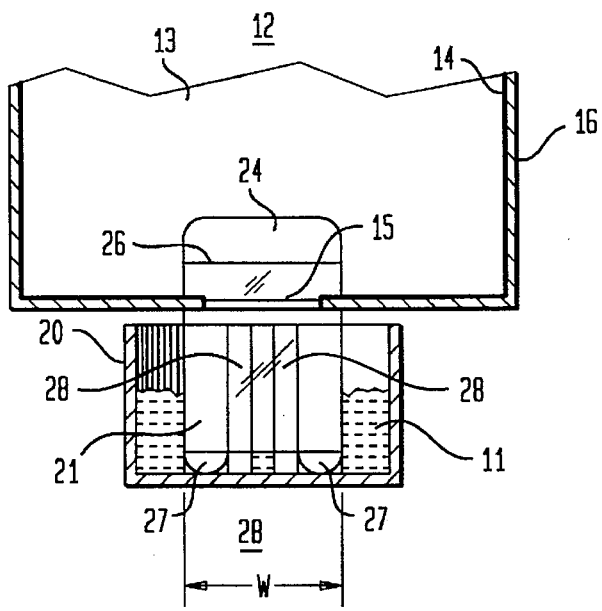
FIGS. 2 and 3 are schematic front and side views of filling apparatus using a capillary wick.
Figure 3:
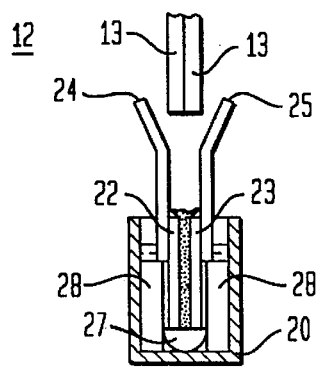

FIG. 2 is a schematic cross section of an improved cell-filling apparatus comprising a reservoir 20 of liquid crystal material 11 and a capillary wick 21 coupled to the reservoir 20 by capillary action. As better shown in the side view of FIG. 3, wick 21 is preferably defined by a pair of parallel, closely-spaced glass plates 22, 23. Advantageously, the width W of wick 21 can approximate the width of filling aperture 15. The upper surfaces of plates 22, 23 define a support surface 26 upon which cell 12 can rest in contact with liquid drawn up by the wick. Advantageously, flanges 24, 25 of glass or metal are provided to align the center of cell 12 with capillary wick 21. Thus the region to be filled is aligned with the wick 21. Preferably the bottom of the wick is provided with a pair of support projections 27 to keep the wick 21 off the bottom of the reservoir. The reservoir 20 is advantageously provided with a plurality of vertical pillars 28 to maintain the wick in vertical position. The projections 27 and pillars 28 are dimensioned and spaced so that liquid 11 can flow into contact with the underside of wick 21.

In the preferred embodiment, reservoir 20, wick 21 and flanges 24, 25 are made of fused quartz glass. Wick 21 comprises plates spaced apart by about 0.1 mm, and a preferred liquid crystal material is ZLI-4792 Liquid Crystal marketed by E. Merck Inc. The width W of wick 21 can be 2 to 3 cm for typical applications.

In operation, cell 12 is applied to the apparatus with the aperture 15 aligned with capillary wick 21 in a low pressure environment (e.g. 5 m Torr). This alignment is facilitated by passing the cell through flanges 24, 25. Liquid crystal material is drawn to the top of wick 21 by capillary action. The pressure is increased as by introducing to the chamber gas at atmospheric pressure, and liquid crystal material is driven into the cell by the pressure differential. As material is drawn from the top of wick 21, additional material is coupled from the reservoir by the action of wick 21 to replenish the supply and thereby provide continuous filling of the cell. Since the cell edge does not contact the reservoir and only a small portion contacts wick 21, contamination and consequent material waste are minimized.

Moreover reservoir 20 can be any convenient size and substantially larger than conventional troughs. Thus a succession of cells can be filled one after the other without intermediate emptying and refilling of a contaminated trough.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

The invention claimed is:

1. Apparatus for filling a liquid crystal display cell, said cell comprising a pair of spaced plates defining a planar region between said plates to be filled, said apparatus comprising:

a reservoir for containing liquid crystal display material;

a capillary wick for drawing liquid crystal material from said reservoir, said wick comprising a pair of closely spaced plates forming a planar capillary wick region therebetween;

said plates of said wick having respective aligned edges forming a support surface for supporting said cell in contact with said capillary wick region; and flanges for aligning said cell on said support surface so that said planar region to be filled is coplanar with said planar capillary wick region.

2. Apparatus of claim 1 wherein said capillary wick comprises plates of fused quartz glass.

3. Apparatus of claim 1 wherein said spaced plates include a plurality of projection for keeping said capillary wick off the bottom of said reservoir.

4. Apparatus of claim 1 wherein said reservoir includes a plurality of vertical projections for maintaining said capillary wick in vertical position.

5. A method for filling a liquid crystal display cell comprising a pair of spaced plates defining a planar region between said plates to be filled with liquid crystal material, said method comprising the steps of:

providing a reservoir of liquid crystal material;

providing a capillary wick comprising a pair of closely spaced plates forming a planar capillary wick region in contact with said liquid crystal material, said spaced plates of said wick having a pair of respective aligned edges forming an upper support surface for supporting said cell in contact with said capillary wick region, said wick drawing said liquid crystal material to said upper support surface; and disposing said display cell on said upper support surface with said planar region to be filled aligned to be coplanar with said planar capillary wick region in contact with the liquid crystal material drawn to said surface.

6. The method of claim 5 further comprising the step of providing a gas pressure differential to drive the liquid crystal material into said display cell.

\* \* \* \* \*